United States Patent [19]
Bunker et al.

[11] 3,739,369

[45] June 12, 1973

[54] HISTORICAL DATA DISPLAY

[75] Inventors: William Marvin Bunker, Ormond Beach, Walter Hosey Tew, Jr., DeLand, both of Fla.

[73] Assignee: General Electric Company, New York, N.Y.

[22] Filed: Jan. 4, 1971

[21] Appl. No.: 103,741

[52] U.S. Cl. .............. 340/324 A, 235/198, 315/22
[51] Int. Cl. .............................................. G06f 3/14
[58] Field of Search ................ 340/324 A; 315/18, 315/22; 235/198

[56] References Cited
UNITED STATES PATENTS

| | | | |
|---|---|---|---|
| 3,686,662 | 8/1972 | Blixt et al. | 340/324 A |
| 3,387,084 | 6/1968 | Hine et al. | 340/324 A |
| 3,603,963 | 7/1971 | Ward | 340/324 A |
| 3,648,270 | 3/1972 | Metz et al. | 340/324 A |
| 3,469,252 | 9/1969 | Bet | 340/324 A |
| 3,474,438 | 10/1969 | Lauher | 340/324 A |
| 3,406,387 | 10/1968 | Werme | 340/324 A |
| 3,543,148 | 11/1970 | Martin | 340/324 A |

*Primary Examiner*—John W. Caldwell
*Assistant Examiner*—Marshall M. Curtis
*Attorney*—Raymond H. Quist, Allen E. Amgott, Henry W. Kaufmann, Frank L. Neuhauser, Oscar B. Waddell and Joseph B. Forman

[57] ABSTRACT

Measurements of a particular parameter are digitized and scaled. The J most recent measurands are displayed as elements on a raster type display. The I scan lines are assigned magnitudes in accordance with their vertical position. Each scan line magnitude is compared with all J elements which are clocked out of a register one by one for comparison and returned to the register. Each comparison results in a color decision and control signal for the portion of the scan line represented by that particular element. At the completion of each frame the measurand register is updated to include more recent measurands.

5 Claims, 6 Drawing Figures

Patented June 12, 1973 3,739,369

INVENTORS.
W. Marvin Bunker
Walter H. Tew, Jr.
BY
ATTORNEY.

HISTORICAL DATA DISPLAY

BACKGROUND OF THE INVENTION

This invention relates to a system for controlling a raster type display to portray the measurements of a parameter over an interval of time.

Chart recorders have long been used to display the history of a measurement; however, for some purposes a permanent record in the form of a chart is not desired while more than the instantaneous measurement is needed. One approach to this display requirement using a cathode ray tube is to use the magnitude of each measurement to control the length of a scan line, so that it changes color when the measured amount is reached. A curve is thereby produced, but one which is drawn vertically rather than horizontally in the conventional manner.

SUMMARY OF THE INVENTION

A measurand register having a capacity equal to the number of elements in each scan line of a raster type display is provided. Parameter measurements which have been scaled and digitized are contained in the measurand register in chronological order. Each scan line is assigned a magnitude in accordance with its vertical position, and is compared with all of the measurands. Each comparison produces a color control signal which causes a portion of the scan line of a length equal to the element width to be a particular color. When all of the scan lines in a frame have been compared, new measurands which have been received are shifted into the measurand register displacing an equal number of the oldest measurands.

DESCRIPTION OF THE PREFERRED EMBODIMENT

Figure 1:
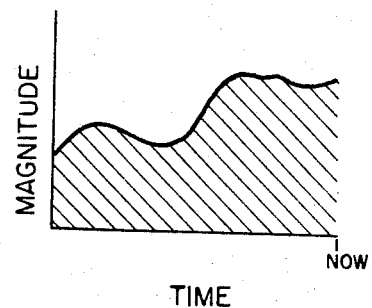
FIG. 1 illustrates one form of a raster type display produced in accordance with the invention.

Referring to FIG. 1, a graph is portrayed indicating the history of a measured quantity such as a temperature or a voltage which is being monitored. Such a graph may be displayed on a cathode ray tube or similar raster display with different colors above and below the curve as shown, or as a line of one color against a background of another color. The term color as used herein includes various intensities of light on a monochrome system. As indicated, the horizontal axis represents a time interval, with the most current time at the right. The vertical axis is used as a representation of the magnitude of the quantity measured.

Since the commonly available cathode ray tube can be operated to display 512 scan lines it is convenient to divide the magnitude scale in 512 parts. Arbitrarily 512 elements were chosen to comprise the time or horizontal distance, although another number can be used.

Figure 2:
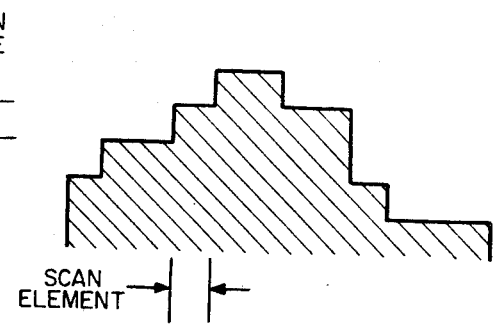
FIG. 2 shows a portion of FIG. 1 on an enlarged scale.

In FIG. 2 a portion of the curve of FIG. 1 is shown on a larger scale. Each scan element represents a measurand, that is a measurement at a particular time having a particular magnitude which has been scaled and digitized. Each scan line is assigned a particular magnitude which may be arrived at by dividing the total range desired to be displayed by 512, or by utilizing a logarithmic scale.

As each raster line is scanned, its assigned magnitude is compared with the magnitude of the measurand at each successive element to determine if this magnitude is greater or less than that of the scan line, and a color decision made accordingly. Thus a white control signal can be produced if the scan line magnitude exceeds the measurand, and a green control signal for the contrary result.

Figure 3:
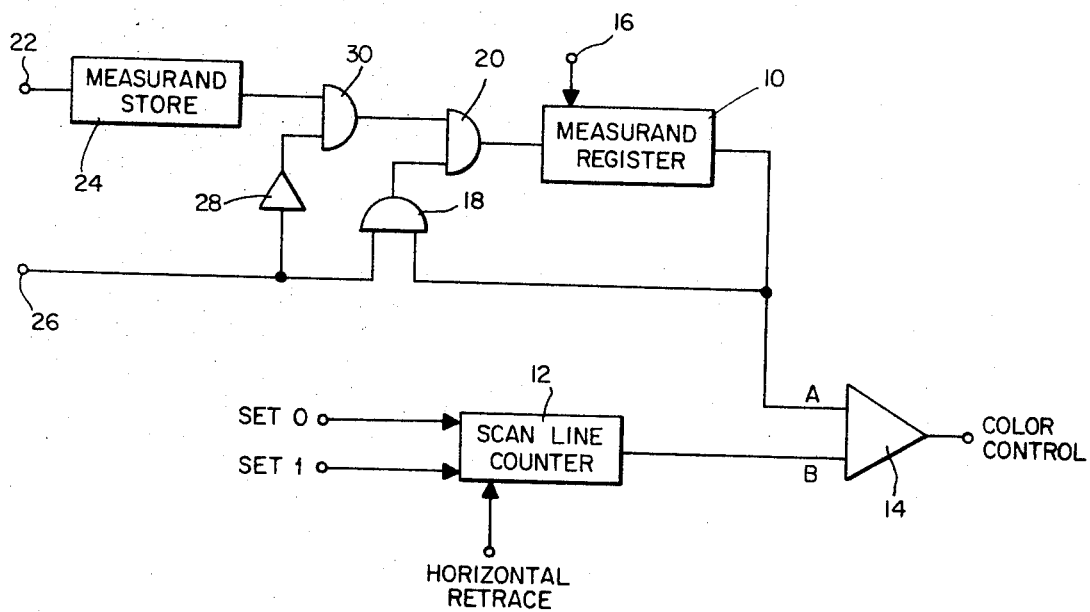
FIG. 3 is a schematic circuit diagram of one embodiment of the invention.

Referring next to FIG. 3, measurand register 10 contains in chronological order as many data words as the number of elements per scan line in the display, with each word representing the scaled and digitized magnitude of a sample of data at a particular time. The most recent data words are at the left end of the register, and the oldest at the right end.

As is customary, each frame of the raster display is divided into two fields, one comprising the even scan lines 0 through 510, and the other the odd scan lines 1 through 511. The two fields are scanned alternately. Scan line magnitude counter 12 which in this embodiment is a nine bit counter produces the magnitudes of scan lines 0 – 511, and is set during vertical retrace alternately to the 0 scan line and the 1 scan line.

As each line is scanned, its magnitude is presented to digital comparator 14 as one input (B). Clock pulses at the element rate are applied on terminal 16 to measurand register 10. Each pulse causes one data word or measurand to be shifted out of the register and applied as the second input (A) to digital comparator 14. The remaining data words are shifted to the right in measurand register 10, and the data word shifted out is reintroduced to measurand register 10 at the left end through AND gate 18 and AND gate 20. Digital comparator 14 compares the magnitude of the measurand with the magnitude of the scan line and decides:

$$A < B = 1 \text{ or}$$
$$A \geq B = 0.$$

This output is used to control the color of the scan line for the duration of that particular element.

At each successive clock pulse applied to terminal 16, the next measurand is compared with the scan line magnitude, and returned to the input of measurand register 10. At the completion of each scan line all the element data words have been returned to the measurand register, and during horizontal retrace the magnitude of the next scan line in the field is applied to comparator 14 to be compared with the contents of measurand register 10, element by element. This process is continued through the last line of the first field. At this time comparison of the scan lines in the second field with the measurands is performed until the frame is completed.

During the display of one frame new data samples may be received. These are applied to terminal 22 and stored in measurand store 24. During vertical retrace at the end of the frame a signal is applied to terminal 26 which disables gate 18, is inverted by inverter 28 and enables gate 30. The new measurands contained in measurand store 24 are transferred to measurand register 10, and a corresponding number of old measurands shifted out of this register. Since gate 18 is disabled these samples are prevented from recirculating to the input of measurand register 10.

Figure 4:
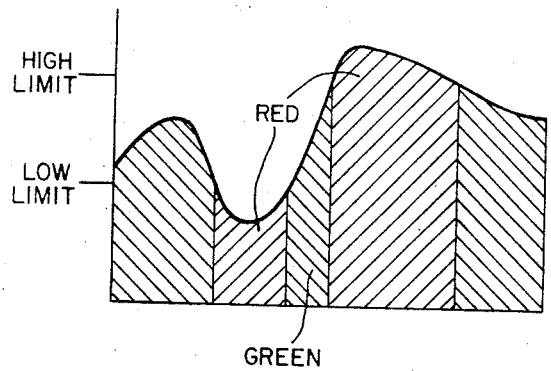
FIG. 4 illustrates another type of display produced in accordance with the invention.

For some purposes it may be desired to have a more pronounced indication when a data measurement falls outside certain limits. In FIG. 4, for example, high and low limits are indicated on the magnitude scale. When measurands fall between these limits the area below the curve is green; however, when measurands fall outside the high and low limits the area below the curve is red. The area above the curve is white.

Figure 5:
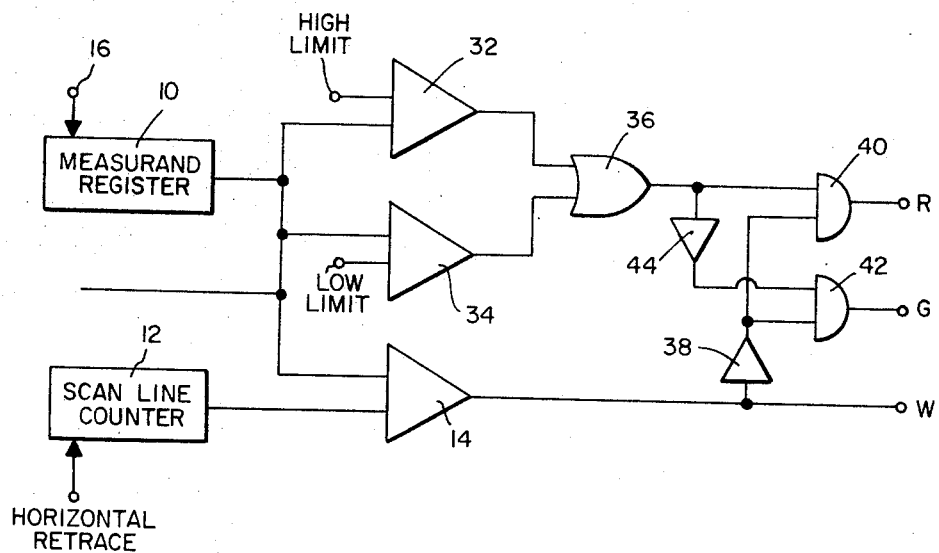
FIG. 5 is a schematic circuit diagram showing modifications of FIG. 3 to produce the display of FIG. 4.

Some additions to the circuitry of FIG. 3 permit this type of display. In FIG. 5 the additions are shown without reproducing all the unchanged portion of FIG. 3. In this arrangement, as each measurand is clocked out of measurand register 10 it is compared not only with the scan line in digital comparator 14, but also with the high and low limits. Comparator 32 has the high limit to be compared with the measurands, and comparator 34 has the low input. OR gate 36 produces a 1 output if the measurand exceeds the high limit or is less than the low limit. In any case where the measurand is greater than (or equal to) the scan line magnitude, comparator 14 has a 0 output. Inverter 38 will then apply a 1 input to AND gates 40 and 42. If OR gate 36 has a 1 output (indicating an out-of-limits condition), AND gate 40 will be enabled to produce a red control signal.

If OR gate 36 has a 0 output, inverter 44 will apply a 1 input to AND gate 42 causing a green control signal.

Finally, in any case where the scan line magnitude is greater than the measurand, comparator 14 has a 1 output and a white control signal is produced.

Figure 6:
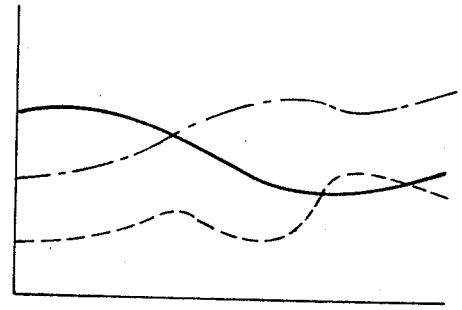
FIG. 6 is another form of display produced in accordance with the invention.

FIG. 6 shows an additional mode of operation possible with the technique of this invention. Data measurements from multiple sources are displayed on the same raster type display. A single line is produced by having digital comparator 14 yield a 1 output only when the measurand equals the scan line magnitude. A measurand register is required for each data source being displayed.

While a particular embodiment of a historical data display has been shown and described, it is obvious that changes and modifications can be made without departing from the spirit of the invention and the scope of the appended claims.

We claim:

1. A system for producing color control signals for a horizontally scanning raster type display to portray the history of a measured parameter comprising:
a register containing measurands of said parameter covering an interval of time in chronological order;
a counter producing scan line magnitudes in accordance with the scan lines' vertical position;
means for comparing the magnitude of the first scan line with all measurands beginning with the oldest, and seriatim each subsequent scan line with all measurands, and for producing for each comparison a first color control signal if the magnitude of said scan line is greater than that of the measurand, and a second color control signal if the magnitude of the measurand is greater than that of the scan line.

2. A system for producing color control signals in accordance with claim 1 further comprising:
means for comparing the magnitude of a measurand with a predetermined limit in those cases where the magnitude of the measurand exceeds that of the scan line and for producing a third color control signal when the limit is exceeded.

3. A system for producing color control signals in accordance with claim 2 further comprising:
means for replacing the oldest measurands in said measurand register with an equal number of more recent measurands when all scan lines in a frame have been compared.

4. A system for producing color control signals for a horizontally scanned raster type display to portray the history of a measured parameter comprising:
a measurand register containing scaled and digitized measurements of said parameter covering an interval of time in chronological order;
a counter producing a first and second sequence of scan line magnitudes in accordance with the scan lines' vertical position, the first sequence covering the odd numbered scan lines, and the second sequence covering the even numbered scan lines;
means for comparing the magnitude of each scan line with all the measurands in said measurand register until said first and second sequences of scan line magnitudes have been completed and for producing color control outputs indicative of the results of each comparison.

5. A system for producing color control signals to produce a graphical representation of the history of a measured quantity from a stream of scaled and digitized measurands by switching between colors on a horizontally scanned raster type display having I scan lines and J scan elements comprising:
a scan line magnitude counter for producing the magnitudes of said I scan lines in digitized form in accordance with the scan lines' vertical position on said raster type display;
a scan element register containing the J most recent scaled and digitized measurands;
means for comparing the magnitude of the first scan line sequentially with the magnitude of each of the J elements and seriatim comparing each subsequent scan line magnitude sequentially with the magnitude of each of the J elements and producing color control outputs indicative of the results of each comparison.

* * * * *